United States Patent
Otsuka et al.

(10) Patent No.: US 8,646,214 B2
(45) Date of Patent: Feb. 11, 2014

(54) WEATHER STRIP

(75) Inventors: Hirofumi Otsuka, Aichi-ken (JP);
Masatoshi Hotta, Aichi-ken (JP);
Hideaki Minoura, Aichi-ken (JP)

(73) Assignee: Toyoda Gosei Co., Ltd., Kiyosu-Shi, Aichi-Ken (JP)

( * ) Notice: Subject to any disclaimer, the term of this patent is extended or adjusted under 35 U.S.C. 154(b) by 272 days.

(21) Appl. No.: 12/662,041

(22) Filed: Mar. 29, 2010

(65) Prior Publication Data
US 2010/0242392 A1 Sep. 30, 2010

(30) Foreign Application Priority Data

Mar. 30, 2009 (JP) .............................. P.2009-081557
Jul. 10, 2009 (JP) .............................. P.2009-163720

(51) Int. Cl.
*E06B 7/16* (2006.01)
(52) U.S. Cl.
USPC ........................................ 49/490.1; 49/498.1
(58) Field of Classification Search
USPC ................... 49/475.1, 490.1, 498.1
See application file for complete search history.

(56) References Cited

U.S. PATENT DOCUMENTS

| | | | |
|---|---|---|---|
| 4,708,351 A * | 11/1987 | Midooka et al. | ............. 277/650 |
| 5,304,409 A | 4/1994 | Nozaki | |
| 5,305,553 A * | 4/1994 | Shimizu et al. | ............. 49/490.1 |
| 5,437,124 A * | 8/1995 | Ahlfeld et al. | ............. 49/479.1 |
| 5,449,544 A | 9/1995 | Ogawa et al. | |
| 5,626,383 A * | 5/1997 | Lee et al. | ............. 296/146.9 |
| 6,245,409 B1 * | 6/2001 | Cook | ............. 428/122 |
| 6,548,143 B1 * | 4/2003 | Heller | ............. 428/122 |
| 6,623,014 B1 * | 9/2003 | Martin | ............. 277/630 |
| 6,739,094 B1 * | 5/2004 | Berry et al. | ............. 49/478.1 |
| 6,874,281 B2 | 4/2005 | Fujita et al. | |

(Continued)

FOREIGN PATENT DOCUMENTS

EP 1 016 558 A2 10/1999
GB 1437722 A 6/1976

(Continued)

OTHER PUBLICATIONS

Japanese Office Action Dated Oct. 16, 2012 with English Translation.

(Continued)

*Primary Examiner* — Jerry Redman
(74) *Attorney, Agent, or Firm* — McGinn IP Law Group, PLLC (57) ABSTRACT

A weather strip 10 has a trim portion 20 and a hollow seal portion 40. The trim portion 20 is made up of an external sidewall 21, a bottom wall 23 and an internal sidewall 22 to thereby be given a substantially U-shaped cross section. A first flange holding lip 24 is formed on an interior surface of either of the external sidewall 21 and the internal sidewall 22 so as to be positioned on an opening side of the trim portion 20, a second flange holding lip 25 is formed on the interior surface of the same sidewall so as to be positioned on a bottom wall side of the trim portion 20, and opposite flange holding lips 26, 27 are formed on an interior surface of the other of the external sidewall 21 and the internal sidewall 22 so as to be positioned between the first flange holding lip 24 and the second flange holding lip 25 while extending therefrom.

16 Claims, 5 Drawing Sheets

(56) References Cited

U.S. PATENT DOCUMENTS

| | | | |
|---|---|---|---|
| 6,926,944 B2 * | 8/2005 | Watanabe | 428/122 |
| 2004/0040215 A1 | 3/2004 | Fujita et al. | |
| 2005/0022454 A1 * | 2/2005 | Aida et al. | 49/490.1 |
| 2005/0076574 A1 | 4/2005 | Nishihara | |
| 2008/0000165 A1 * | 1/2008 | Ochiai | 49/490.1 |
| 2008/0148646 A1 * | 6/2008 | Nozaki et al. | 49/490.1 |
| 2009/0266000 A1 * | 10/2009 | Minoura et al. | 49/490.1 |

FOREIGN PATENT DOCUMENTS

| | | |
|---|---|---|
| JP | 59-059539 A | 4/1984 |
| JP | 2001-341588 | 12/2001 |
| JP | 2004-149103 A | 5/2004 |
| JP | 2005-119350 A | 5/2005 |
| JP | 3752627 | 12/2005 |
| JP | 2008-230258 | 10/2008 |
| JP | 2008-230258 A | 10/2008 |

OTHER PUBLICATIONS

Japanese Notification of Reasons for Refusal, dated Jun. 20, 2013, with English translation.

* cited by examiner

Prior Art

FIG. 8

WEATHER STRIP

BACKGROUND OF THE INVENTION

1. Field of the Invention

The present invention relates to a weather strip that is mounted on a flange around a circumferential part of an opening in a vehicle body of a motor vehicle.

2. Description of the Related Art

A motor vehicle has opening portions such as a door opening, a luggage compartment or trunk opening and the like, and weather strips are individually mounted on flanges around circumferential parts of the opening portions formed in a vehicle body of the motor vehicle so as to establish seals between the circumferential parts of the openings in the vehicle body and respective mating members such as a door and a trunk lid.

When these weather strips are mounted on the circumferential parts of the openings in the vehicle body, the flanges formed around the circumferential parts of the vehicle body openings are inserted into trim portions of the weather strips which each have a substantially U-shaped cross section.

Figure 6:
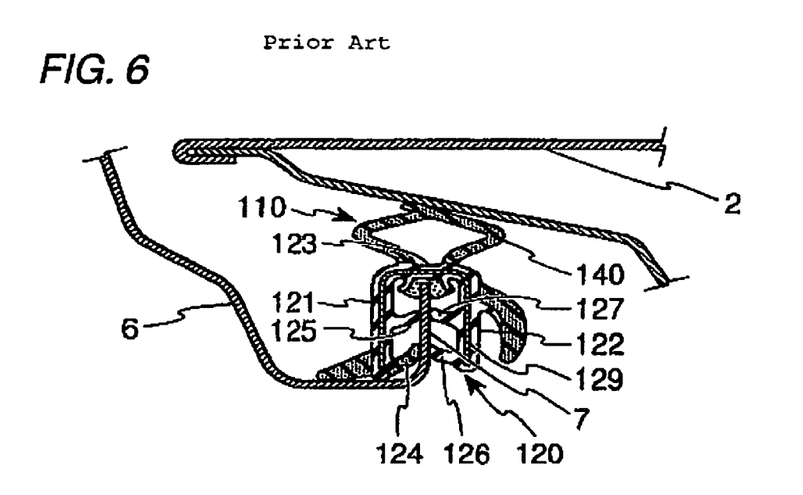
FIG. 6 is a sectional view of a conventional weather strip.

For example, as shown in FIG. 6, an opening portion at a rear luggage compartment or trunk of a motor vehicle is sealed by mounting a weather strip 110 on a flange 7 provided around a circumferential part 6 of the opening portion in a vehicle body of the motor vehicle so as to confront the perimeter of a lid for the rear trunk.

Namely, the weather strip 110 has a trim portion 120 which is mounted on the flange 7 and a hollow seal portion 140 having a hollow space inside which is brought into contact with a back surface of the trunk lid 2 so as to seal a gap defined therebetween, whereby the opening portion is sealed by the hollow seal portion 140 being brought into contact with the back surface of the trunk lid 2.

The trim portion 120 includes a sidewall 121 facing a vehicle's outer side or an external side of the flange 7, a sidewall 122 facing a vehicle's inner side or an internal sidewall 122 and a bottom wall 123 to thereby be given a substantially U-shaped cross section. In order to increase the holding of the flange 7 by the trim portion 120, an insert 129 made of a metal plate is embedded in the trim portion 120.

In the interior, having a substantially U-shape in section, of the trim portion 120, external flange holding lips 124, 125 and internal flange holding lips 126, 127 are formed on the interior surfaces of the external sidewall 121 and the internal sidewall 122, respectively, so as to extend to form a substantially inverted V-like shape in section towards the bottom wall 123 side of the interior of the trim portion 120.

When mounting the weather strip 110 on the flange 7, the trim portion 120 is mounted on the flange 7 provided around the peripheral part of the opening of the rear trunk from thereabove so that the flange 7 is inserted into the interior having the substantially U-shape in section of the trim portion 120. The external flange holding lips 124, 125 and the internal flange holding lips 126, 127 are provided to extend from the interior surfaces of the trim portion 120, and the holding force by the trim portion 120 is increased by the insert 129. In this configuration, the flange 7 is held by the flange holding lips 124, 125, 126, 127 so as to be held therebetween, so that not only is the posture of the weather strip 110 maintained, but also the weather strip 110 is prevented from being dislocated from the flange 7. As this occurs, the hollow seal portion 140, which is provided integrally at an upper portion of the trim portion 120, is brought into contact with the back surface of the outer circumferential part of the trunk lid 2 so as to seal a gap defined between the circumferential part 6 of the opening in the vehicle body and the trunk lid 2.

However, in many cases, the insert 120 is formed of metal due to increase the holding force of the trim portion 120, and this eventually increases the overall weight of the weather strip 110, which has been found not preferable from the viewpoint of meeting the trend of reducing the weights of vehicles.

Figure 7:
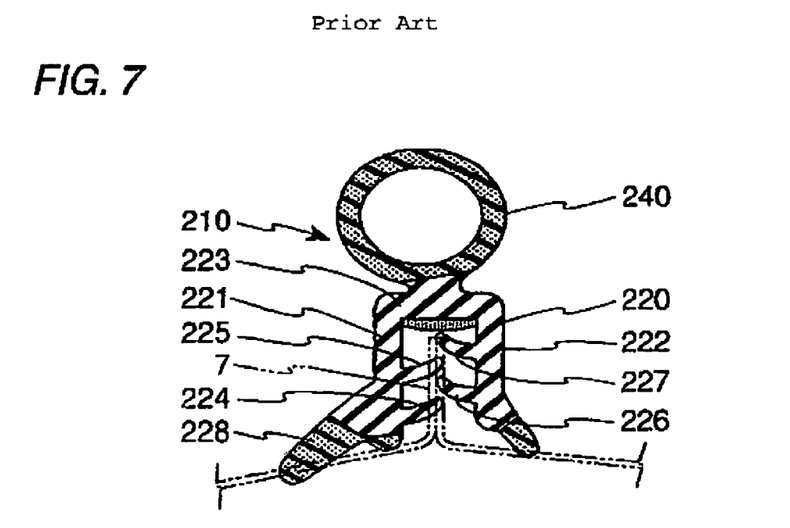
FIG. 7 is a sectional view of another conventional weather strip.

Because of this, as shown in FIG. 7, there exists a weather strip 210 having a hollow seal portion 240 in which instead of embedding metal inserts in a trim portion 220, an external sidewall 221, an internal sidewall 222 and a bottom wall 223 have a substantially constant thickness and are formed of a hard rubber material or a hard resin material (for example, refer to Patent Document 1 and Patent Document 2). Note that making the thicknesses of the external sidewall 221 and others is to improve the shape stability at the time of extrusion.

However, in this case, since no metal insert is embedded, although the object to reduce the weight of the weather strip 210 can be achieved, the force with which the trim portion 220 holds the flange 7 is reduced, and there has happened sometimes a case in which the trim portion 220 gets easy to be dislocated from the flange 7. When the weather strip 210 is mounted at a corner portion of the opening portion in the vehicle body, since the weather strip 210 is bent, there has happened sometimes a case in which the holding lip 226 or the like is deformed inwardly (towards the sidewall from which it or the like extends) so that the holding lip 226 or the like gets easy to be dislocated from the flange 7 or a case in which the weather strip 210 (the trim portion 220) leans depending on a balance failure between a body seal lip 228 and the internal holding lips 226, 227.

Figure 8:
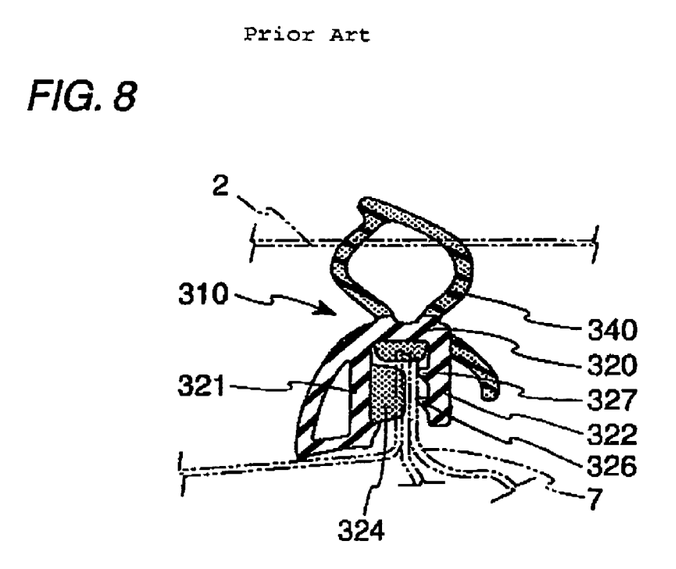
FIG. 8 is a sectional view of a further conventional weather strip.

Then, as shown in FIG. 8, there exists a weather strip 310 having a hollow seal portion 340 and a trim portion 320 in which a sponge member 324 having a trapezoidal cross section is formed on an interior surface of an external sidewall 321 of the trim portion 320, while internal holding lips 326, 327 are formed on an interior surface of an internal sidewall 322 so that a flange 7 is held between the sponge member and the internal holding lips (for example, refer to Patent Document 3). In this case, however, when attempting to mold a trim portion 320 having a substantially U-shape cross section into a shape resulting when it is mounted on the flange 7, a space is required between the sponge member 324 and the internal holding lips 326, 327, whereby the holding force (inserting force, dislocating force) relative to the flange 7 is reduced, and the seal performance is also reduced.

Patent Document 1: Japanese Patent No. 3752627
Patent Document 2: JP-2008-230258
Patent Document 3: JP-2001-341588

SUMMARY OF THE INVENTION

Then, an object of the invention is to provide a vehicle weather strip which can reduce the weight thereof to meet the trend of reducing the weights of motor vehicles and in which a shape of a trim portion is stabilized to thereby increase a holding force thereby of a flange around a circumferential part of an opening portion in a vehicle body.

A first aspect of the invention provided with a weather strip, comprising a trim portion adapted to be mounted on a flange around a circumferential part of an opening portion in a vehicle body and formed of a solid material or a finely foamed material having a substantially U-shaped cross section; and a hollow seal portion formed of a sponge material so as to be integral with the trim portion and adapted to be brought into contact with a mating member which confronts the opening portion in the vehicle body so as to establish a seal between the circumferential part of the opening portion in the vehicle body and the mating member; wherein the trim portion comprises an external sidewall, a bottom wall and an internal sidewall so as to have the substantially U-shaped cross section, and flange holding lips being formed on the interior surfaces of the external sidewall and the internal sidewall so as to extend into the interior of the substantially U-shaped cross section; wherein a first flange holding lip is formed on the interior surface of either of the external sidewall and the internal sidewall so as to be positioned on an opening side of the trim portion and a second flange holding lip is formed on the inner surface of the same sidewall so as to be positioned on a bottom wall side of the trim portion; and wherein an opposite flange holding lip is formed on the interior surface of the other of the external sidewall and the internal sidewall so as to be positioned and extended between the first flange holding lip and the second flange holding lip.

In the first aspect of the invention, the first flange holding lip is formed on the interior surface of either of the external sidewall and the internal sidewall so as to be positioned on the opening side of the trim portion and the second flange holding lip is formed on the interior surface of the same sidewall so as to be positioned on the bottom wall side of the trim portion. In addition, the opposite flange holding lip is formed on the interior surface of the other of the external sidewall and the internal sidewall so as to be positioned between the first flange holding lip and the second flange holding lip while extending therebetween.

Because of this, the space between the first flange holding lip and the second flange holding lip is extended, which means that the flange can be held over a wide area although it is actually held at the two portions, whereby the flange can be held stably with the opposite flange holding lip pressed against the flange. In addition, when the trim portion leans to the flange about the opposite flange holding lip as a fulcrum, the first flange holding lip and the second flange holding lip have to be deflected largely, and therefore, this makes it difficult for the trim portion to lean relative to the flange. Consequently, the first flange holding lip or the second flange holding lip can be a strut bracing the flange when the trim portion rotates, thereby making it possible to prevent the lean of the weather strip.

A second aspect of the invention provides with the weather strip, wherein a plurality of opposite flange holding lips identical to the opposite flange holding lip are formed, and wherein a distal end of the first flange lip and a distal end of the second flange lip and distal ends of the opposite flange holding lips are made to extend longer than the distal ends of the others towards the sidewall of the others' side.

In the second aspect of the invention, since the plurality of opposite flange holding lips are formed, the flange can be held stably.

The distal end of the first flange holding lip and the distal end of the second flange holding lip and the distal ends of the opposite flange holding lips are made to extend longer than the distal ends of the others towards the sidewall of the others' side. Because of this, the distal ends of the flange holding lips contact each other but are overlapped one on the top of the other at predetermined intervals in a vertical direction. In this configuration, a deflection amount of the distal end of each flange holding lip which is brought into contact with the flange when the flange is inserted into the interior of the trim portion is increased, which increases, in turn, the flange holding force, whereby the flange can be prevented from being dislocated from the trim portion.

A third aspect of the invention provides with a weather strip, comprising a trim portion adapted to be mounted on a flange around a circumferential part of an opening portion in a vehicle body and formed of a solid material or a finely foamed material having a substantially U-shaped cross section; and a hollow seal portion formed of a sponge material so as to be integral with the trim portion and adapted to be brought into contact with a mating member which confronts the opening portion in the vehicle body so as to establish a seal between the circumferential part of the opening portion in the vehicle body and the mating member; wherein the trim portion comprise an external sidewall, a bottom wall and an internal sidewall so as to have the substantially U-shaped cross section, and flange holding lips being formed on internal surfaces of the external sidewall and the internal sidewall so as to extend into an interior of the substantially U-shaped cross section, wherein a first flange holding lip is formed on the interior surface of either of the external sidewall and the internal sidewall so as to be positioned on an opening side of the trim portion, a second flange holding lip is formed on the interior surface of the same sidewall so as to be positioned on a bottom wall side of the trim portion, and opposite flange holding lips are formed on the interior surface of the other of the external sidewall and the internal sidewall so as to be positioned and extended between the first flange holding lip and the second flange holding lip; and wherein distal ends of the first flange holding lip and the opposite flange holding lip which is opposite to the first flange holding lip are formed so as to be close to each other, the second flange holding lip is formed so as to form a smaller angle relative to the external sidewall or the internal sidewall than an angle formed by the first flange holding lip, and the opposite flange holding lip which is opposite to the second flange holding lip is formed to form a smaller angle relative to the external sidewall or the internal sidewall than an angle formed by the opposite flange holding lip which is opposite to the first flange holding lip.

In the third aspect of the invention, the distal ends of the first flange holding lip and the opposite flange holding lip which is opposite to the first flange holding lip are formed so as to be close to each other. Because of this, when the flange is inserted into the trim portion, a distal end of the flange is made easy to be inserted between the distal end of the first flange holding lip and the opposite flange holding lip. In addition, since a root portion of the flange can be held from both sides in substantially the same positions after the insertion of the flange, there occurs no such situation that the trim portion leans.

The second flange holding lip is formed so as to form the smaller angle relative to the external sidewall or the internal sidewall than the angle formed by the first flange holding lip, and the opposite flange holding lip which is opposite to the second flange holding lip is formed to form the smaller angle relative to the external sidewall or the internal sidewall than the angle formed by the opposite flange holding lip which is opposite to the first flange holding lip. Because of this, when the flange is dislocated from the trim portion, the distal end of the second flange holding lip and the distal end of the opposite flange holding lip which is opposite to the second flange holding lip are brought into close contact with side surfaces of the flange, and an amount in which the distal end of each flange holding lip is bent or turned reversely is increased, whereby a force which the flange needs to be dislocated from the trim portion is increased.

A fourth aspect of the invention provides with the weather strip, wherein a distal end of the second flange holding lip and a distal end of the opposite flange holding lip which is opposite to the second flange holding lip are made to extend longer than the distal end of the other so as to extend longer towards the sidewall of the other's side.

In the fourth aspect of the invention, the distal end of the second flange holding lip and the distal end of the opposite flange holding lip which is opposite to the second flange holding lip are made to extend longer than the distal end of the other so as to extend longer towards the sidewall of the other's side. Because of this, when the flange is dislocated from the trim portion, areas over which the distal end of the second flange holding lip and the distal end of the opposite flange holding lip which is opposite to the second flange holding lip are brought into contact with the side surfaces of the flange are increased, and this increases the flange holding force and stabilizes the flange. In addition, when the flange is dislocated from the trim portion, the amount in which the distal end of each flange holding lip is bent or turned reversely is increased, whereby the force w which the flange needs to be dislocated from the trim portion is increased.

A fifth aspect of the invention provides with the weather strip, wherein the second flange holding lip is formed so that when mounted on the flange, the distal end of the second flange holding lip is not brought into contact with the bottom wall but lies close to the bottom wall, and the first flange holding lip is formed at a distalmost end of the Interior surface of the external sidewall or the internal sidewall.

In the fifth aspect of the invention, the second flange holding lip is formed so that when mounted on the flange, the distal end of the second flange holding lip is not brought into contact with the bottom wall but lies close to the bottom wall, and the first flange holding lip is formed at the distalmost end of the interior surface of the external sidewall or the internal sidewall. Because of this, when the trim portion is mounted on the flange, the flange can be inserted deep into the trim portion, the distal end of the second flange holding lip can hold the flange in an ensured fashion. Since the first flange holding lip is formed at the distalmost end of the interior surface of the external sidewall or the internal sidewall, a width between the portions where the flange is held by the first flange holding lip and the second flange holding lip is extended, whereby the flange can be held stably.

A sixth aspect of the invention provides with a weather strip, wherein the distal ends of the first flange holding lip, the second flange holding lip and the opposite flange holding lips are formed so as to be bent towards a bottom wall side of an interior of the trim portion.

In the sixth aspect of the invention, the respective distal ends of the flange holding lips are formed so as to be bent towards the bottom wall side of the interior of the trim portion. Because of this, when the flange is inserted into the trim portion, the respective distal ends of the flange holding lips which are formed so as to be bent towards the bottom wall side of the interior of the trim portion are brought into contact with the side surfaces of the flange in a surface contact fashion to hold the flange, whereby the flange can be held stably and the flange is made difficult to be dislocated.

A seventh aspect of the invention provides with the weather strip, wherein a bent portion is formed on either of the external sidewall and the internal sidewall in a position which lies apart from the bottom wall towards a distal end side of each sidewall by a distance larger than a thickness of the bottom wall but closer to the bottom wall side than a center of each sidewall, and a distal end side of the sidewall which lies further distal than the bent portion is formed so as to approach the opposite sidewall.

In the seventh aspect of the invention, the bent portion is formed on either of the external sidewall and the internal sidewall in the position which lies apart from the bottom wall towards the distal end side of each sidewall by the distance larger than the thickness of the bottom wall but closer to the bottom wall side than the center of each sidewall, and the distal end side of the sidewall which lies further distal than the bent portion is formed so as to approach the opposite sidewall. Because of this, the force with which the flange is held by the sidewall formed so that the distal end side further distal than the bent portion approaches the opposite sidewall and the flange holding lip is increased, the flange can be prevented from being dislocated from the trim portion at the corner portions.

A eighth aspect of the invention provides with the weather strip, wherein the first flange holding lip, the second flange holding lip and the opposite flange holding lips are formed of a solid material or a finely foamed material of a rubber or thermoplastic elastomer which is identical to that of the sidewalls but whose hardness is lower than a hardness of the external sidewall, the bottom wall and the internal sidewall.

In the eighth aspect of the invention, the respective flange holding lips are formed of the solid material or finely foamed material of a rubber or thermoplastic elastomer which is identical to that of the sidewalls but whose hardness is lower than the hardness of the external sidewall, the bottom wall and the internal sidewall. Because of this, the flange can be held strongly and rigidly by the external sidewall, the bottom wall and the internal sidewall, and the respective flange holding lips are brought into flexible contact with the flange, whereby even in the event that there are irregularities formed on the surfaces of the flange, the flange holding lips can hold the flange well enough to ensure the seal between the flange and a mating member such as a trunk lid or the like.

A ninth aspect of the invention provides with the weather strip wherein the trim portion is formed of a solid material or a finely foamed material having a hardness corresponding to International Rubber Hardness (IRHD) 80 to 95 degrees, and the flange holding lips are formed of a solid material or a finely foamed material having a hardness corresponding to International Rubber Hardness (IRHD) 50 to 75 degrees.

In the ninth aspect of the invention, the trim portion is formed of the solid material or finely foamed material having the hardness corresponding to International Rubber Hardness (IRHD) 80 to 95 degrees. Thus, even in the event that no insert is embedded in the trim portion, there occurs no such situation that an opening portion in the trim portion is opened, the trim portion is allowed to have a sufficient flange holding force.

The flange holding lips are formed of the solid material or finely foamed material having the hardness corresponding to International Rubber Hardness (IRHD) 50 to 75 degrees. Thus, the flange insertion force is reduced while maintaining the sufficient flange holding force.

According to the invention filed for patent by the subject patent application, the space between the first flange holding lip and the second flange holding lip is extended, whereby the flange can be held stably by the first and second flange holding lips so spaced apart together with the opposite flange holding portions which are formed to lie between the first and second flange holding lips. In addition, the first flange holding lip and the second flange holding lip can function as struts bracing the flange when the trim portion rotates, whereby the lean of the weather strip can be prevented.

DESCRIPTION OF THE PREFERRED EMBODIMENTS

Preferred embodiments of the invention will be described based on FIGS. 1 to 5.

Figure 1:
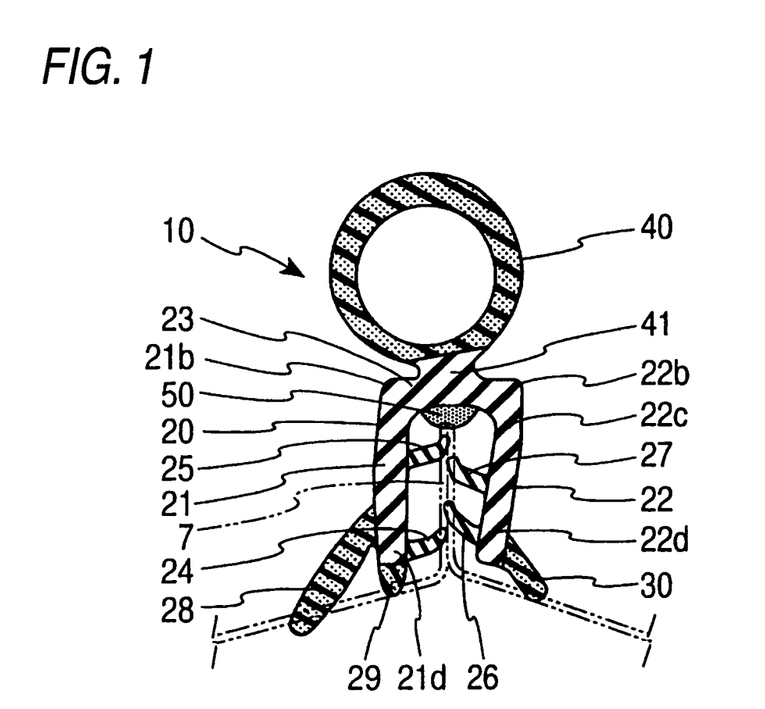
FIG. 1 is a sectional view, taken along the line A-A in FIG. 5, which shows a state in which a weather strip according to a first embodiment of the invention is mounted on a vehicle body.
Figure 2:
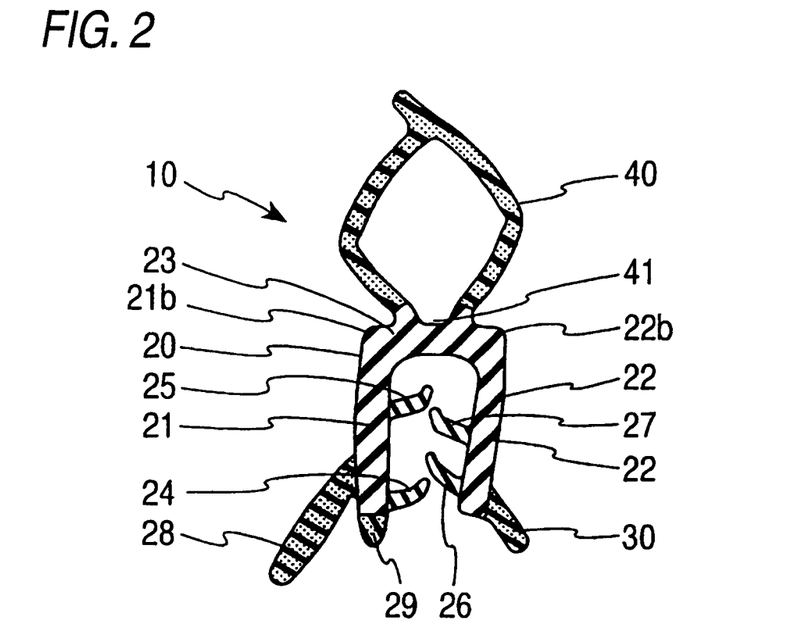
FIG. 2 is a sectional view, taken along the line A-A in FIG. 5, of a weather strip according to a second embodiment of the invention, which is ready for mounting on the vehicle body.
Figure 3:
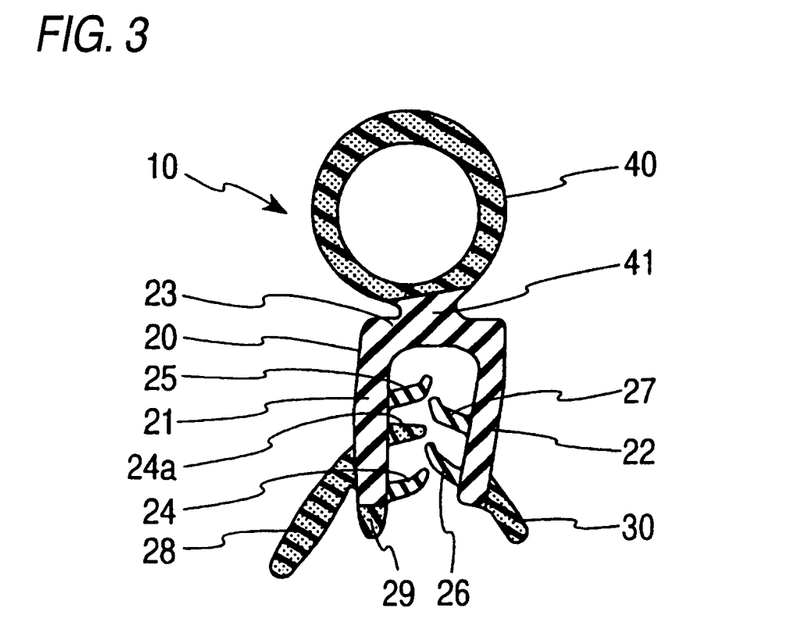
FIG. 3 is a sectional view, taken along the line A-A in FIG. 5, which shows a weather strip according to a third embodiment of the invention, which is ready for mounting on the vehicle body.
Figure 4:
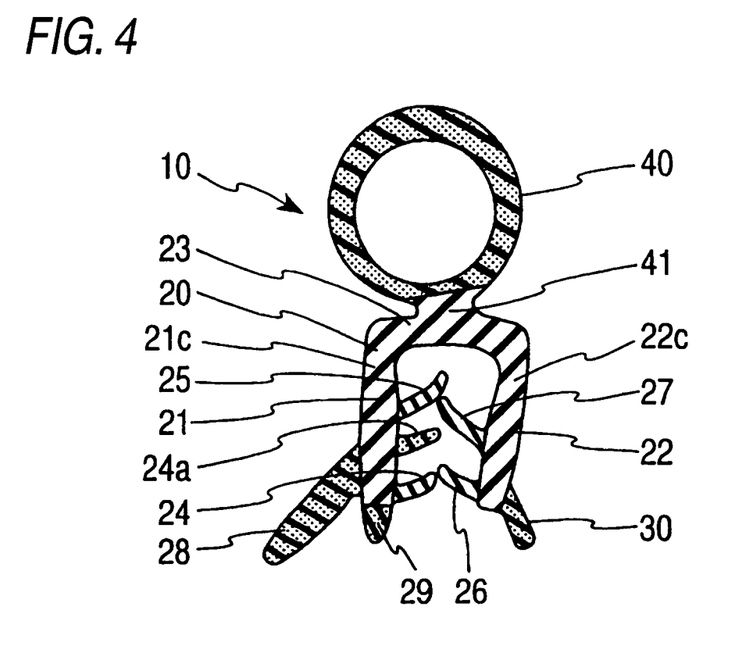
FIG. 4 is a sectional view, taken along the line A-A in FIG. 5, which shows a weather strip according to a fourth embodiment of the invention, which is ready for mounting on the vehicle body.
Figure 5:
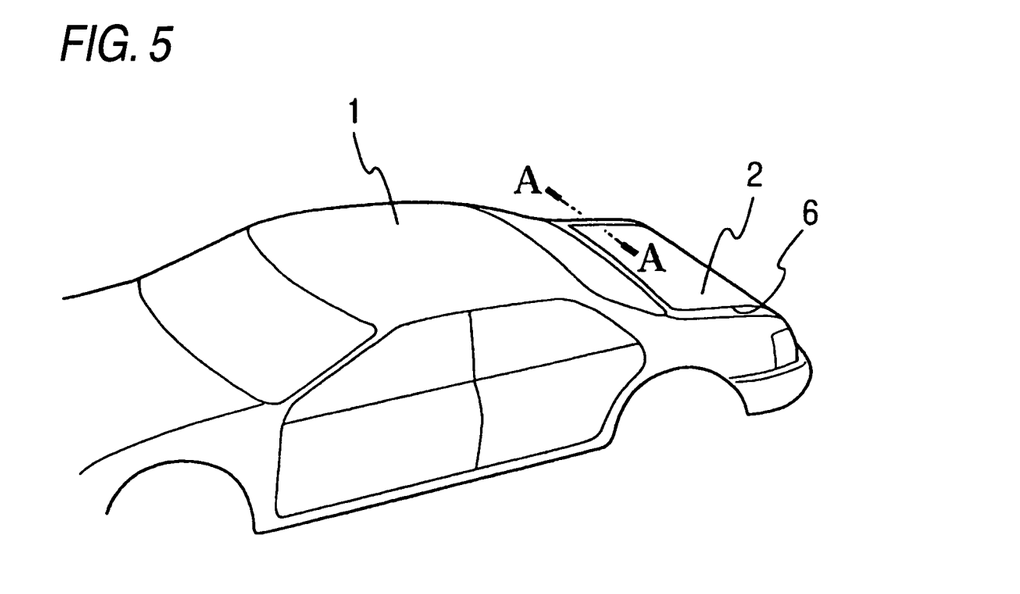
FIG. 5 is a schematic perspective view of a motor vehicle, resulting when it is viewed obliquely from thereabove.

FIG. 1 is a sectional view of a weather strip 10 according to a first embodiment of the invention. FIGS. 2 to 4 are also sectional views showing weather strips according to second to fourth embodiments of the invention.

The first embodiment of the invention will be described as being applied to a weather strip 10 adapted to be mounted on a rear luggage compartment or trunk of a motor vehicle. However, the invention can also be applied to weather strips that are used to seal various opening portions formed in the motor vehicle. The weather strips include a weather strip for a transverse rear door or tailgate, weather strips for opening portions formed in sides for side doors and in a roof of the motor vehicle for a sun roof or the like, and a hood seal for sealing the peripheral part of an engine compartment of the motor vehicle.

As shown in FIG. 1, the weather strip 10 of the first embodiment of the invention is made up of a trim portion 20 which is mounted on a flange 7 and a hollow seal portion 40 which is brought into contact with a trunk lid 2 for sealing a gap defined between the flange 7 and the trunk lid 2.

The trim portion 20 includes a sidewall 21 facing a vehicle's outer side or an external side of the flange 7, a sidewall 21 facing a vehicle's inner side or an internal side of the flange 7, and a bottom wall 23 to thereby be given a substantially U-shaped cross section. No frame piece such as a metal plate is embedded in the external sidewall 21, the internal sidewall 22 and the bottom wall 23. Namely, the external sidewall 21, the internal sidewall 22 and the bottom wall 23 are formed of a hard material of rubber or thermoplastic elastomer (a solid or finely foamed material having a hardness corresponding to IRHD (International Rubber Hardness) 80 to 95 degrees).

A first flange holding lip facing the vehicle's outer side or an external flange holding lip 24 is formed on an interior surface of the external sidewall 21 so as to be positioned on an opening side of the trim portion 20 having the substantially U-shaped cross section, and a second flange holding lip facing the vehicle's outer side or an external flange holding lip 25 is formed on the interior surface of the external sidewall 21 so as to be positioned on a bottom wall side in the interior of the trim portion 20.

A first flange holding lip facing a vehicle's inner side or an internal flange holding lip 26 and a second flange holding lip facing the vehicle's inner side or an internal flange holding lip 27, which are opposite flange holding lips which are opposite to the first external flange holding lip 24 and the second external flange holding lip 25, are formed on an interior surface of the internal sidewall 22. The first internal flange holding lip 26 is formed at the opening side and the second internal flange holding lip 27 is formed at the bottom wall 23 side on the interior surface of the trim portion 20.

These flange holding lips are formed so that a distal end of the first internal flange holding lip 26 and a distal end of the second internal flange holding lip 27 are positioned between a distal end of the first external flange holding lip 24 and a distal end of the second external flange holding lip 25.

Because of this, a space between the first external flange holding lip 24 and the second external flange holding lip 25 is extended, and this enables the flange 7 to be held by the first and second external flange holding lips 24, 25 so positioned and the first and second internal flange holding lips 26, 27 which are opposite to the first and second external flange holding lips 24, 25 and are positioned therebetween, whereby the flange 7 can be held therebetween in a stable fashion.

When leaning, the trim portion 20 leans relative to the flange 7 about the first internal flange holding lip 26 and the second internal flange holding lip 27 as fulcrums. In order to make this happen, however, either the first external flange holding lip 24 or the second external flange holding lip 25 needs to be deflected largely. Because of this, the trim portion 20 is made difficult to lean relative to the flange 7. Namely, when the trim portion 20 rotates, either the first external flange holding lip 24 or the second external flange holding lip 25 can be a strut bracing the flange 7, thereby making it possible to prevent the lean of the weather strip 10. Because of this, the hollow seal portion 40 is stabilized with respect to its position, whereby the hollow seal portion 40 is brought into contact with the trunk lid 2 in an ensured fashion to establish a seal between the flange 7 and the trunk lid 2.

On the contrary to what has been described above, a configuration may be adopted in which the first internal flange holding lip 26 is formed on the opening side of the trim portion 20, the second internal flange holding lip 27 is formed on the bottom wall 23 side of the trim portion 20, and the first external flange holding lip 24 and the second external holding lip 25, which are now opposite flange holding lips which lie opposite the first internal flange holding lip 26 and the second internal flange holding lip 27, are formed to lie between the first and second internal flange holding lips 26, 27. As this occurs, the distal end of the first external flange holding lip 24 and the distal end of the second external holding lip 25 are positioned between the distal end of the first internal flange holding lip 26 and the second internal flange holding lip 27.

When the distal end of the first external flange holding lip 24 and the distal end of the second external holding lip 25 are positioned between the distal end of the first internal flange holding lip 26 and the second internal flange holding lip 27, either the first internal flange holding lip 26 or the second internal flange holding lip 27 can be a strut bracing the flange 7, thereby making it possible to prevent the lean of the weather strip 10. Because of this, the hollow seal portion 40 is brought into contact with the trunk lid 2 in an ensured fashion to establish a seal between the flange 7 and the trunk lid 2.

The second external flange holding lip 25, which is formed on the bottom wall 23 side of the interior of the trim portion 20 on the interior surface of the external sidewall 21, is preferably formed so that the second external flange holding lip 25 lies as close to the bottom wall 23 as possible without the distal end thereof being brought into contact with an interior surface of the bottom wall 23 when the trim portion 20 is mounted on the flange 7. As this occurs, when the trim portion 20 is mounted on the flange 7, a distal end of the flange 7 can be inserted deep into the trim portion 20, whereby the distal ends of the second external flange holding lip 25 and the second internal flange holding lip 27 can hold the flange 7 in an ensured fashion.

The first external flange holding lip 24 is preferably formed at a distalmost end of the opening side of the interior surface of the external sidewall 21. As this occurs, a space between the second external flange holding lip 25 and the first external flange holding lip 24 are extended, which means that the flange 7 can be held over a wide area although it is actually held at the two portions, whereby the flange 7 can be held stably.

The distal ends of the first external flange holding lip 24, the second external flange holding lip 25, the first internal flange holding lip 26 and the second internal flange holding lip 27 are preferably formed so as to be bent towards the bottom wall side of the interior of the trim portion 20. As this occurs, when the flange 7 is inserted into the trim portion 20, the respective distal ends of those flange holding lips, which are formed so as to be bent towards the bottom wall side of the interior of the trim portion 20, are brought into contact with side surfaces of the flange 7 in a surface contact fashion to hold the flange 7, whereby not only can the flange 7 be held stably, but also the flange 7 can be made difficult to be dislocated from the trim portion 20.

The distal ends of the first external flange holding lip 24 and the second external flange holding lip 25 and the distal ends of the first internal flange holding lip 26 and the second internal flange holding lip 27 are formed so as to extend longer than the others towards the others' sidewall. Because of this, the distal ends of the first and second external flange holding lips 24, 25 and the distal ends of the first and second internal flange holding lips 26, 27 do not contact each other but are overlapped at predetermined intervals in a vertical direction within the trim portion 20 before the flange 7 is inserted into the trim portion 20.

When the flange 7 is inserted into the trim portion 20, the distal end of the flange 7 moves into the trim portion while pushing apart transversely the respective distal ends of those flange holding lips and is eventually brought into contact with the bottom wall 23 or a calking member provided on the interior surface of the bottom wall 23. Then, a deflection amount of the distal end of each flange holding lip is increased, and this increases, in turn, the holding force of the flange 7, thereby making it possible to prevent the dislocation of the flange 7 from the trim portion 20.

The external flange holding lips 24, 25 and the internal flange holding lips 26, 27 are formed of the same kind of EPDM rubber or thermoplastic elastomer material as that of the external sidewall 21 and the like, but the hardness of the material used is preferably smaller than that of the external sidewall 21, the bottom wall 23 and the internal sidewall 22. As this occurs, the external sidewall 21, the bottom wall 23 and the internal sidewall 22 hold the flange strongly and rigidly therebetween. In addition, the external flange holding lips 24, 25 and the internal flange holding lips 26, 27 are brought into soft contact with the flange 7, and even in case there are irregularities on the surfaces of the flange 7, the flange 7 can be held in an ensured fashion by those flange holding lips for sealing.

The external flange holding lips 24, 25 and the internal flange holding lips 26, 27 are preferably formed of the same kind of material as that of the external sidewall 21 and the like. The hardness of the material preferably corresponds to IRHD (International Rubber Hardness) 70 degrees. Note that those flange holding lips can be fabricated using a material whose hardness ranges from 65 degrees or more to less than 75 degrees. As this occurs, even in case there are irregularities on the surfaces of the flange 7, the flange holding lips can be given enough flexibility for them to be brought into soft contact with the flange 7 and enough rigidity for them to hold the flange 7.

The external sidewall 21 and the bottom wall 23 are connected together at a corner portion. An angular portion 21b that constitutes an exterior surface of the corner portion is preferably formed so that an angle formed by the external sidewall 21 and the bottom wall 23 falls in a range from 90 to 95 degrees. Similarly, the internal sidewall 22 and the bottom wall 23 are connected together at a corner portion. An angular portion 22b that constitutes an exterior surface of the corner portion is preferably formed so that an angle formed by the internal sidewall 22 and the bottom wall 23 falls in a range from 90 to 95 degrees. In the embodiment, the angle of the angular portions 21b, 22b is 95 degrees. In this case, the angle of the corner portions is a right angle or an obtuse angle close to the right angle, and this increases the rigidity in the corner portions of the external sidewall 21 and the internal sidewall 22, whereby the holding of a distal end of the flange by the flange holding lips, which will be described later, of the trim portion 20 is facilitated.

The angular portion 21b on the exterior surface of the corner portion between the bottom wall 23 and the external sidewall 21 and the angular portion 22b on the exterior outer surface of the corner portion between the bottom wall and the internal sidewall 22 are preferably formed with a radius of curvature of on the order of 0.5 mm. As this occurs, the rigidity at both the corner portions is increased, and this prevents the external sidewall 21 and the internal sidewall 22 from being opened about or moved apart from each other from the corresponding corner portions, which increases the holding force of the flange by the external sidewall 21 and the internal sidewall 22 which are formed of the hard material. Thus, there occurs no such situation that the flange 7 is dislocated from the trim portion 20 even in the event that no insert is embedded in the trim portion 20.

In the weather strip 10 of the first embodiment of the invention, an insertion load necessary for the flange 7 to be inserted into the weather strip 10 is on the order of 12N/100 mm, and a dislocation load which allows the dislocation of the flange 7 from the weather strip 10 is on the order of 50N/100 mm. The insertion load of the conventional weather strip in which the insert is embedded is on the order of 10N/100 mm, and the dislocation load thereof is on the order of 55N/100 mm. In this way, compared with the conventional weather strip, both the insertion load and the dislocation load of the weather strip 10 of the invention are almost the same as those of the conventional weather strip. Thus, the insertion load is small, and hence, good insertion properties of the flange 7 into the weather strip 10 are provided, while the sufficient holding force is given.

In this embodiment, the external sidewall 21, the bottom wall 23 and the internal sidewall 22 are formed of a hard material of rubber or thermoplastic elastomer whose hardness corresponds to IRHD (International Rubber Hardness) 90 degrees. Because of this, the overall rigidity of the trim portion 20 is increased, and the holding force of the flange 7 by the external sidewall 21 and the internal sidewall 22 is increased with no insert embedded. In addition, since the hard material of rubber or thermoplastic elastomer is extruded without an insert, the extrusion of the sidewalls is facilitated, leading to an increase in productivity.

The external sidewall 21, the bottom wall 23 and the internal sidewall 22 are preferably formed of an EPDM rubber or olefin-based thermoplastic elastomer. As to their hardness, the external sidewall 21, the bottom wall 23 and the internal sidewall 22 are preferably formed of a solid material or finely foamed material which is a material whose hardness ranges from 75 degrees of more to 95 degrees or less as expressed in IRHD (International Rubber Hardness). As this occurs, even in the event that the flange 7 is bent along the vehicle body, the external sidewall 21, the bottom wall 23 and the internal sidewall 22 can be given the flexibility that enables them to follow the bending and the sufficient rigidity to hold the flange 7 therebetween.

An internal sidewall bent portion 22c is formed on the internal sidewall 22 at the connecting portion with the bottom wall 23 in a position which lies apart a distance corresponding to a thickness of the bottom wall 23 towards a distal end side of the internal sidewall 22 from the bottom wall 23 and closer to the bottom wall 23 side than a center of the internal sidewall 22. Because of this, a space between an internal sidewall distal end portion 22d, which constitutes a distal 10, end of the internal sidewall 22, and an external sidewall distal end portion 21d, which constitutes a distal end of the external sidewall 21, is formed to be narrowed. In this embodiment, a bending angle at the bent portion 22c of the internal sidewall 22 from the normal direction towards the inside of the trim portion 20 is about eight degrees. This bending angle is preferably set to range from five degrees to ten degrees.

Because of this, the internal sidewall distal end portion 22d and the external sidewall distal end portion 21d press the first internal flange holding lip 26 and the first external flange holding lip 24 against the flange 7 as will be described later, which increases the holding force of the flange 7, whereby the flange 7 can be prevented from being dislocated from the trim portion 20 at the corner portions or the like.

In this embodiment, while the internal sidewall bent portion 22c is formed on the internal sidewall 22, an external sidewall bent portion may be formed in the same position on the external sidewall 21.

A relatively thick body seal lip 28, having a substantially uniform thickness along the full length thereof and made of a sponge material, is formed on the exterior surface of the opening side of the external sidewall 21 in a position lying in proximity to a distal end of the same sidewall so to extend obliquely downwards therefrom. Because of this, when the body seal lip 28 is brought into contact with the circumferential part 6 of the opening portion in the vehicle body, a distal end of the body seal lip 28 is allowed to abut the circumferential part 6 as contacting linearly, and a force with which the distal end presses the circumferential part 6 is increased, whereby the seal properties thereof are improved. Consequently, ingress of rain water, dust, noise and the like into a passenger compartment from the circumferential part 6 of the opening portion in the vehicle body by way of the flange 7 and the trim portion 20 can be prevented, whereby a space between the circumferential part 6 of the opening portion in the vehicle body and the weather strip 10 can be sealed.

In the event that the body seal lip 28 is formed substantially with the same thickness from root to distal end thereof, when a distal end of the body seal lip 28 is brought into contact with the circumferential part 6 of the opening portion in the vehicle body, the elasticity of the body seal lip 28 is increased. Thus, the force with which the distal end of the body seal lip 28 presses the circumferential part 6 of the opening portion in the vehicle body becomes strong, and the seal properties thereof is improved.

The body seal lip 28 is formed of the sponge material. Because of this, the flexibility of the body seal lip 28 is increased, which enables the body seal lip 28 to follow irregularities or deformations on the circumferential part 6 of the opening portion in the vehicle body so as to ensure the seal properties thereof.

A sub-body seal lip 29 is provided on the interior surface of the open end side of the external sidewall 21 in a position lying in proximity to the distal end of the same sidewall so as to extend downwards therefrom. As is shown in FIG. 1, the sub-body seal lip 29 is formed linearly and is formed shorter and smaller than the body seal lip 28 and the first external flange holding lip 24. Because of this, when the weather strip 10 is mounted on the flange 7, the sub-body seal lip 29 is brought into contact with a curved portion at a connecting portion between the root of the flange 7 and the circumferential part 6 of the opening portion in the vehicle body.

Since it is formed smaller, the sub-body seal lip 29 can be deformed closely along the curved shape of the root of the flange 7. Should there be rain water passing through a gap between the body seal lip 28 and the circumferential part 6 of the opening portion in the vehicle body, further ingress of the rain water can be prevented at the sub-body seal lip 29 in an ensured fashion. In addition, noise can be cut off, and the seal properties of the weather strip 10 can be increased.

In the event that the sub-body seal lip 29 is formed of a sponge material, the flexibility thereof is increased, and the sub-body seal lip 29 is allowed to follow irregularities and deformations at the root of the flange 7, the seal properties being thereby ensured.

A cover seal lip 30 is formed at a lower portion on an interior surface of the internal sidewall 22 so as to extend inwardly downwards in a curved fashion. After the weather strip 10 is mounted on the flange 7, the cover seal lip 30 is disposed to cover an end portion of an internal panel, a garnish (not shown) or a panel (not shown) which is provided inside the passenger compartment, so as not only to seal a gap between the weather strip 10 and the garnish or the panel but also to cover the gap to improve the appearance of the portion in question.

When the cover seal lip 30 is formed of a sponge material, the flexibility thereof is increased, thereby enabling the cover seal lip 30 to follow a change in the gap between the weather strip 10 and the garnish or the panel so as to ensure the seal properties thereof.

As shown in FIG. 1, a calking member 50 may be formed on the interior surface of the bottom wall 23 in the interior of the trim portion. As this occurs, in the event that the distal end of the flange 7 is inserted in an interior of the calking member 50, the rust resistance and seal properties of the flange 7 can be increased.

The hollow seal portion 40 is formed on the exterior surface of the bottom wall 23 of the trim portion 20 so as to rise upwards. The hollow seal portion 40 can be formed of the sponge material into a substantially rhombic hollow shape, a substantially oval hollow shape or a substantially circular hollow shape in section. Since it is hollow, the hollow seal portion 40 is given flexibility. When compared with a case in which the hollow seal portion 40 has a lip-like shape, there is little chance that the hollow seal portion 40 deforms abnormally, which enables the hollow seal portion 40 to be brought into contact with a predetermined position on the trunk lid 2 in an ensured fashion to implement required sealing. In addition, in the event that the hollow seal portion 40 has the substantially rhombic cross section or substantially oval cross section, when a distal end of the hollow seal portion 40 is brought into contact with the trunk lid 2, a swollen portion at a central portion of the substantially rhombic or oval shape is deflected to be bent, so that the hollow seal portion 40 can be brought into contact with the trunk lid 2 softly.

In the event that the hollow seal portion 40 is formed of the sponge material, when the hollow seal portion 40 is brought into contact with the trunk lid 2, which is a mating member to be sealed, due to the flexibility provided by the sponge material, the distal end of the hollow seal portion 40 can be brought into contact with the trunk lid 2 in an ensured fashion while following the shape thereof, thereby high seal properties being provided.

When the trim portion 20 is mounted on the flange 7, as has been described above, the weather strip 40 is held by the first external flange holding lip 24 and the second external flange holing lip 25, and the first internal flange holding lip 26 and the second internal flange holding lip 27, whereby the posture of the weather strip 10 is held stably.

Then, the hollow seal portion 40, which is formed integrally with the upper surface of the trim portion 20 on an upper side thereof, can be brought into contact with the back surface of the trunk lid 2 in an ensured fashion to thereby seal the gap between the trunk lid 2 and the circumferential part 6 in the opening portion in the vehicle body.

The sponge materials of the hollow seal portion 40, the body seal lip 28, the sub-body seal lip 29 and the cover seal lip 30 are formed of a rubber expanded material whose specific weight is 0.4. The sponge materials can be formed of rubber expanded materials whose specific weights range from 0.3 or more to 0.6 or less. As this occurs, the hollow seal portion 40, the body seal lip 28, the sub-body seal lip 29 and the cover seal lip 30 are formed of the rubber expanded materials whose specific weights range from 0.3 or more to 0.6 or less, not only can the weight of the weather strip 10 be reduced, but also rich elasticity and flexibility can be provided, whereby even in the event that the weather strip 10 is used for a long period of time, the seal properties thereof can be ensured.

The hollow seal portion 40 is formed so as to rise from a position on the outer surface of the bottom wall 23 which lies in proximity to a central portion thereof via a neck portion 41. Since it is formed via the neck portion 41, the hollow seal portion 40 can be deformed freely, whereby sealing to the shape of the mating member can be implemented. In addition, the neck portion 41 can be formed of a solid material. As this occurs, high rigidity is given to the neck portion, whereby the hollow seal portion is stable with respect to its position. Thus, when the hollow seal portion 40 is brought into contact with the circumferential part 6 of the opening in a vehicle body or the mating member, a position with which the hollow seal portion 40 is brought into contact becomes stable, thereby making it possible to ensure the seal properties thereof.

Next, a second embodiment of the invention will be described based on FIG. 2.

In the second embodiment, a weather strip 10 will be described as being applied to one for a rear door.

When compared with the first embodiment, the second embodiment differs from the first embodiment in that a hollow seal portion 40 has a different shape, and the other constituent elements thereof remain the same as those of the first embodiment. Therefore, the description of the constituent elements that remain the same will be omitted, and only the different constituent element will be described.

In the second embodiment, similar to the first embodiment, a first external flange holding lip 24 and a second external flange holding lip 25, and a first internal flange holding lip 26 and a second internal flange holding lip 27 are formed, so as to increase the holding force of a flange 7.

In the second embodiment, the hollow seal portion 40 has a substantially rhombic cross section, and sealing walls of the hollow seal portion 40 are provided so as to extend directly from a bottom wall 23 of a trim portion 20 without a neck portion provided. Since the hollow seal portion 40 has the substantially rhombic cross section, the hollow seal portion 40 can be deflected at a bent portion thereof, and therefore, high flexibility can be given thereto, whereby the hollow seal portion 40 can be brought into contact with the rear door in an ensured fashion while following a shape thereof. In addition, a bottom portion of the hollow seal portion 40 is connected directly to the bottom wall 23, the hollow seal portion 40 becomes stable.

Next, a third embodiment of the invention will be described based on FIG. 3.

In the third embodiment, a weather strip 10 will be described as being applied to one that is brought into contact with a trunk lid 2 for sealing.

When compared with the first embodiment, the third embodiment differs from the first embodiment in that an external water cut-off lip 24a is formed on an interior surface of an external sidewall 21, and the other constituent elements remain the same as those of the first embodiment. Consequently, the description of the constituent elements that remain the same will be omitted, and only the different constituent element will be described.

The external water cut-off lip 24a is formed on the interior surface of the external sidewall 21 so as to be positioned between a first external flange holding lip 24 and a second external flange holding lip 25 while extending therefrom in the direction of an internal sidewall 22.

When a flange 7 is inserted into a trim portion 20, the external water cut-off lip 24a is brought into contact with an external side surface of the flange 7, so as to seal off an area in an interior of the trim portion 20 lying further inwards than the water cut-off lip 24a from rain water or noise which attempts to filtrate the trim portion 20 from an external side thereof.

Next, a fourth embodiment of the invention will be described based on FIG. 4.

In the fourth embodiment, a weather strip 10 will be described as being applied to one that is brought into contact with a back surface of a trunk lid for sealing.

When compared with the first embodiment, the fourth embodiment is identical to the first embodiment in that a distal end of a first external flange holding lip 24 is formed closer to an opening side of a trim portion 20 than a distal end of a first internal flange holding lip 26 which lies opposite to the first external flange holding lip 24 but differs from the first embodiment in that the distal ends of the first external flange holding lip 24 and the first internal flange holding lip 26 are formed so as to approach each other and that as in the case with the third embodiment, an external water cut-off lip 24a is provided. The other constituent elements of the fourth embodiment remain the same as those of the first embodiment, and therefore, the description of the constituent elements that remain the same will be omitted, while only the different constituent elements will be described.

Namely, the distal end of the first external flange holding lip 24 and the first internal flange holding lip 26 are formed so as to approach each other. Because of this, for example, as in the first embodiment, in the event that the distal ends of the first external flange holding lip 24 and the first internal flange holding lip 26 are formed so as to be overlapped one on the top of the other in the vertical direction with the predetermined interval provided therebetween, when the flange 7 is inserted into the trim portion 20, the distal end of the flange 7 slides on the surface of the first external flange holding lip 24, and thereafter, the distal end of the flange 7 is caught on a lower surface of the first internal flange holding lip 26. However, in the fourth embodiment, even when the distal end of the flange 7 slides, there is nothing ahead of the flange 7 which catch the distal end of the flange 7. Because of this, the distal end of the flange 7 is made easy to be inserted between the distal end of the first external flange holding lip 24 and the distal end of the first internal flange holding lip 26. In addition, since a root portion of the flange 7 can be held from both sides thereof in substantially the same positions once the flange 7 has been so inserted, there occurs no such situation that the trim portion 20 leans.

Further, a second external flange holding lip 25 is formed at a smaller angle relative to an external sidewall 21 than an angle of the first flange holding lip 24 relative to the same sidewall, and a second internal flange holding lip 27, which is opposite to the second external flange holding lip 25 is formed at a smaller angle relative to an internal sidewall 22 than an angle of the first internal flange holding lip 26 relative to the same sidewall. Because of this, when the flange 7 is attempted to be dislocated from the trim portion 20, the distal end of the second external flange holding lip 25 and the distal end of the second internal flange holding lip 27 are brought into close contact with side surfaces of the flange 7. Then, when the flange 7 is attempted further to be dislocated from the trim portion 20, an amount in which the distal end of each of the holding lips 25, 27 is bent or turned reversely is increased, a dislocation force which is necessary for the flange 7 to be dislocated from the trim portion 20 can be increased.

The angles that are formed between the first flange holding lips 24, 26 and the corresponding sidewalls 21, 22 preferably range from 55 degrees to 65 degrees, and in the fourth embodiment, the angles are 60 degrees. In addition, the angles formed between the second flange holding lips 25, 27 and the corresponding sidewalls 21, 22 preferably range from 40 degrees to 50 degrees, which are smaller than the angles of the first flange holding lips 24, 26, and in the fourth embodiment, the angles are 45 degrees.

Also in the fourth embodiment, since the sidewalls 21, 22 are inclined at about eight degrees, projection angles of the lips relative to the normal direction are 66 degrees and 52 degrees, respectively.

Similar to the first embodiment, the external sidewall 21 and a bottom wall 23 are formed so that an angle formed therebetween becomes 95 degrees, and the internal sidewall 22 and the bottom wall 23 are formed so that an angle formed therebetween becomes 95 degrees. In addition, an angular portion 21b on the exterior surface of a corner portion between the bottom wall 23 and the external sidewall 21 and an angular portion 22b on the exterior surface of a corner portion between the bottom wall 23 and the internal sidewall 22 are formed with a radius of curvature of 0.5 mm.

Further, similar to the first embodiment, an external side wall bent portion 21c and an internal sidewall bent portion 22c are formed, and portions of the external sidewall 21 and the internal sidewall 22 which lie further distal than the bent portion 21c, 22c are individually bent inwards at an angle of about eight degrees. Further, portions of the external sidewall 21 and the internal sidewall 22 which lie closer to an opening side of the trim portion 20 than the external sidewall bent portion 21c and the internal sidewall bent portion 22c are formed so as to swell to be thick at the center thereof. Because of this, an internal sidewall distal end portion 22d, which constitutes a distal end of the internal sidewall 22, and an external sidewall distal end portion 21d, which constitutes a distal end of the external sidewall 21, are formed so as to narrow a space therebetween, and this increases the holding force of the flange 7.

In extrusion and molding of the weather strip 10 of the invention, synthetic rubbers and thermoplastic elastomers are used. For example, an EPDM rubber can be used as a synthetic rubber, and a polyolefin-based thermoplastic elastomer can be used as a thermoplastic elastomer. When the EPDM rubber and the olefin-based thermoplastic elastomer are used, a simultaneous extrusion can be implemented by use of the same kind of materials, thereby making it possible to fabricate a product having good weather-resistance. In addition, since they are the olefin-based resin and rubber of the same kind, the materials can be reused without being separated, thereby making it possible to obtain a product which can easily be recycled.

A linear portion of a weather strip 10 is extruded by an extrusion machine, and thereafter, the linear portion so extruded is cut to a predetermined length for fabrication. Portions that are to be mounted as corner portions are molded by use of a mold, and the linear portion cut to the predetermined length and the portions are connected together at the same time as the portions are molded as corner portions.

In the case of the synthetic rubber, a linear portion is transferred into a vulcanization chamber after extrusion, where the linear portion is vulcanized by being heated by hot air or high-frequency wave. In the case of the thermoplastic elastomer, a linear portion extruded is cooled to be set.

What is claimed is:

1. A weather strip, comprising:
a trim portion adapted to be mounted on a flange around a circumferential part of an opening portion in a vehicle body and comprising one of a solid material and a finely foamed material having a substantially U-shaped cross section; and
a hollow seal portion comprising a sponge material so as to be integral with the trim portion and adapted to be brought into contact with a mating member which confronts the opening portion in the vehicle body so as to establish a seal between the circumferential part of the opening portion in the vehicle body and the mating member,
wherein the trim portion comprises an external sidewall, a bottom wall, and an internal sidewall comprising the substantially U-shaped cross section, said trim portion further comprising flange holding lips formed on interior surfaces of the external sidewall and the internal sidewall so as to extend into an interior of the substantially U-shaped cross section,
wherein a first flange holding lip is formed on the interior surface of either of the external sidewall and the internal sidewall so as to be positioned on an opening side of the trim portion and a second flange holding lip is formed on the interior surface of a same sidewall so as to be positioned on a bottom wall side of the trim portion,
wherein a plurality of opposite flange holding lips are formed on the interior surface of an other of the external sidewall and the internal sidewall so that all of the plurality of opposite flange holding lips are to be positioned and extended between the first flange holding lip and the second flange holding lip,
wherein a distal end of the first flange lip and a distal end of the second flange lip are configured to extend past distal ends of the plurality of opposite flange holding lips,
wherein the second flange holding lip is formed at a position closest to the bottom wall where the second holding lip does not have a contact with the bottom wall when the second flange holding lip is attached to the flange, and
wherein the first flange holding lip is formed at a distalmost end of the opening side of the trim portion on the interior surface.

2. The weather strip as set forth in claim 1, wherein the second flange holding lip is formed so that when mounted on the flange, the distal end of the second flange holding lip is not brought into contact with the bottom wall but lies close to the bottom wall, and the first flange holding lip is formed at a distalmost end of the interior surface of the external sidewall or the internal sidewall.

3. The weather strip as set forth in claim 1, wherein each of the distal ends of the first flange holding lip, the second flange holding lip, and the opposite flange holding lips is formed so as to be bent towards a bottom wall side of an interior of the trim portion.

4. The weather strip as set forth in claim 1, wherein a bent portion is formed on either of the external sidewall and the internal sidewall in a position which lies apart from the bottom wall towards a distal end side of each sidewall by a distance larger than a thickness of the bottom wall but closer to the bottom wall side than a center of each sidewall, and a distal end side of the sidewall which lies further distal than the bent portion is formed so as to approach the opposite sidewall.

5. The weather strip as set forth in claim 1, wherein the first flange holding lip, the second flange holding lip, and the opposite flange holding lips comprise one of a solid material and a finely foamed material of a rubber or thermoplastic elastomer, which is identical to that of the sidewalls but comprising a hardness is lower than a hardness of the external sidewall, the bottom wall, and the internal sidewall.

6. The weather strip as set forth in claim 1, wherein the trim portion comprises one of a solid material and a finely foamed material having a hardness corresponding to International Rubber Hardness (IRHD) 80 to 95 degrees, and the flange holding lips comprise one of a solid material and a finely foamed material having a hardness corresponding to International Rubber Hardness (IRHD) 50 to 75 degrees.

7. A weather strip, comprising:
a trim portion adapted to be mounted on a flange around a circumferential part of an opening portion in a vehicle body and comprising one of a solid material and a finely foamed material having a substantially U-shaped cross section; and
a hollow seal portion comprising a sponge material so as to be integral with the trim portion and adapted to be brought into contact with a mating member which confronts the opening portion in the vehicle body so as to establish a seal between the circumferential part of the opening portion in the vehicle body and the mating member,
wherein the trim portion comprise an external sidewall, a bottom wall, and an internal sidewall comprising the substantially U-shaped cross section, said trim portion further comprising flange holding lips formed on interior surfaces of the external sidewall and the internal sidewall so as to extend into an interior of the substantially U-shaped cross section,
wherein a first flange holding lip is formed on the interior surface of either of the external sidewall and the internal sidewall so as to be positioned on an opening side of the trim portion, a second flange holding lip is formed on the interior surface of a same sidewall so as to be positioned on a bottom wall side of the trim portion, and a plurality of opposite flange holding lips are formed on the interior surface of an other of the external sidewall and the internal sidewall so that all of the plurality of opposite flange holding lips are to be positioned and extended between the first flange holding lip and the second flange holding lip,
wherein distal ends of the first flange holding lip and the plurality of opposite flange holding lips, which are opposite to the first flange holding lip, are formed so as to be close to each other, the second flange holding lip is formed so as to form a smaller angle relative to the external sidewall or the internal sidewall than an angle formed by the first flange holding lip, and the opposite flange holding lips, which are opposite to the second flange holding lip, is formed to form a smaller angle relative to the external sidewall or the internal sidewall than an angle formed by the opposite flange holding lips which are opposite to the first flange holding lip,
wherein a distal end of the first flange lip and a distal end of the second flange lip are configured to extend past distal ends of the opposite flange holding lips,
wherein the second flange holding lip is formed at a position closest to the bottom wall where the second holding lip does not have a contact with the bottom wall when the second flange holding lip is attached to the flange, and
wherein the first flange holding lip is formed at a distalmost end of the opening side of the trim portion on the interior surface.

8. The weather strip as set forth in claim 7, wherein the second flange holding lip is formed so that when mounted on the flange, the distal end of the second flange holding lip is not brought into contact with the bottom wall but lies close to the bottom wall, and the first flange holding lip is formed at a distalmost end of the interior surface of the external sidewall or the internal sidewall.

9. The weather strip as set forth in claim 7, wherein each of the distal ends of the first flange holding lip, the second flange holding lip, and the opposite flange holding lips is formed so as to be bent towards a bottom wall side of an interior of the trim portion.

10. The weather strip as set forth in claim 7, wherein a bent portion is formed on either of the external sidewall and the internal sidewall in a position which lies apart from the bottom wall towards a distal end side of each sidewall by a distance larger than a thickness of the bottom wall but closer to the bottom wall side than a center of each sidewall, and a distal end side of the side wall which lies further distal than the bent portion is formed so as to approach the opposite side wall.

11. The weather strip as set forth in claim 7, wherein the first flange holding lip, the second flange holding lip, and the opposite flange holding lips comprise one of a solid material and a finely foamed material of a rubber or thermoplastic elastomer, which is identical to that of the sidewalls but comprising a hardness is lower than a hardness of the external sidewall, the bottom wall, and the internal sidewall.

12. The weather strip as set forth in claim 7, wherein the trim portion comprises one of a solid material and a finely foamed material having a hardness corresponding to International Rubber Hardness (IRHD) 80 to 95 degrees, and the flange holding lips comprise one of a solid material and a finely foamed material having a hardness corresponding to International Rubber Hardness (IRHD) 50 to 75 degrees.

13. A weather strip, comprising:
a hollow seal portion;
a trim portion provided on said hollow seal portion, said trim portion being formed in a substantially U-shape, said U-shape comprising a first sidewall, a second sidewall opposite from the first sidewall, and a bottom wall connected between the first sidewall and the second sidewall and associated with the hollow seal portion;
a first flange holding lip provided on an interior surface of the first sidewall, the first flange holding lip extending inward from the interior surface of the first sidewall towards the second sidewall;

a second flange holding lip provided on the interior surface of the first sidewall, the second flange holding lip provided near a bottom portion of the first sidewall, the second flange holding lip extending inward from the interior surface of the first sidewall towards the second sidewall;

a first opposite flange holding lip provided on an interior surface of the second sidewall, the first opposite flange holding lip extending inward from the interior surface of the second sidewall towards the first sidewall, the first opposite flange holding lip provided between the first flange holding lip and the second flange holding lip and extending beyond respective ends of the first and second flange holding lips; and a second opposite flange holding lip provided on the interior surface of the second sidewall, the second opposite flange holding lip extending inward from the interior surface of the second sidewall towards the first sidewall, the second opposite flange holding lip provided between the first flange holding lip and the second flange holding lip, and extending beyond respective ends of the first and second flange holding lips, wherein each of the first and second opposite flange holding lips are positioned and extended between the first flange holding lip and the second flange holding lip, wherein the second flange holding lip is formed at a position closest to the bottom wall where the second holding lip does not have a contact with the bottom wall when the second flange holding lip is attached to the flange, and wherein the first flange holding lip is formed at a distalmost end of the opening side of the trim portion on the interior surface.

14. The weather strip apparatus according to claim 13, wherein distal ends of the first flange holding lip, the second flange holding lip, the first opposite flange holding lip, and the second opposite flange holding lip are configured to be bent towards the bottom wall.

15. The weather strip apparatus according to claim 13, wherein the trim portion comprises a material having a hardness corresponding to International Rubber Hardness (IHD) of 80 degrees to 95 degrees, and wherein the first flange holding lip, the second flange holding lip, the first opposite flange holding lip, and the second opposite flange holding lip comprise a material having a hardness corresponding to International Rubber Hardness (IHD) of 50 degrees to 75 degrees.

16. The weather strip apparatus according to claim 15, wherein the hollow portion comprises a sponge material having a hollow shape.

* * * * *